United States Patent
Wang

(10) Patent No.: US 10,045,007 B2
(45) Date of Patent: Aug. 7, 2018

(54) METHOD AND APPARATUS FOR PRESENTING 3D SCENE

(71) Applicant: BOE TECHNOLOGY GROUP CO., LTD., Beijing (CN)

(72) Inventor: Tao Wang, Beijing (CN)

(73) Assignee: BOE TECHNOLGOY GROUP CO., LTD., Beijing (CN)

( * ) Notice: Subject to any disclaimer, the term of this patent is extended or adjusted under 35 U.S.C. 154(b) by 184 days.

(21) Appl. No.: 15/037,511

(22) PCT Filed: Jan. 21, 2016

(86) PCT No.: PCT/CN2016/071616
§ 371 (c)(1),
(2) Date: May 18, 2016

(87) PCT Pub. No.: WO2017/028498
PCT Pub. Date: Feb. 23, 2017

(65) Prior Publication Data
US 2017/0054972 A1    Feb. 23, 2017

(30) Foreign Application Priority Data
Aug. 19, 2015   (CN) .......................... 2015 1 0512281

(51) Int. Cl.
*H04N 15/00* (2006.01)
*H04N 13/00* (2018.01)
(Continued)

(52) U.S. Cl.
CPC ......... *H04N 13/0278* (2013.01); *G06T 15/20* (2013.01); *H04N 13/0014* (2013.01); *G06T 2215/16* (2013.01)

(58) Field of Classification Search
USPC ......... 348/51, 42, 47, 48; 386/239, 326, 353
See application file for complete search history.

(56) References Cited

U.S. PATENT DOCUMENTS

| | | | | |
|---|---|---|---|---|
| 2004/0223190 A1* | 11/2004 | Oka | ...................... | G06L 15/205 358/302 |
| 2009/0244267 A1* | 10/2009 | Yuan | ...................... | G06F 3/012 348/51 |
| 2014/0306963 A1* | 10/2014 | Sun | .................... | H04N 13/0402 345/427 |

FOREIGN PATENT DOCUMENTS

| | | |
|---|---|---|
| CN | 101729920 A | 6/2010 |
| CN | 103488413 A | 1/2014 |

(Continued)

OTHER PUBLICATIONS

Search Report and Written Opinion dated Mar. 24, 2016 from State Intellectual Property Office of the P.R. China.
(Continued)

*Primary Examiner* — Daquan Zhao
(74) *Attorney, Agent, or Firm* — Dilworth & Barrese, LLP.; Michael J. Musella, Esq.

(57) ABSTRACT

A 3D scene presenting method and apparatus are provided. The 3D scene presenting method for application in a 3D scene presenting apparatus includes: loading 3D scene information, where multiple pieces of 3D image information are stored in the 3D scene information, and each piece of 3D image information carries corresponding shooting position information; determining observation position information of a current observer in real time when the observer is detected in a viewable angle range of the 3D scene presenting apparatus, where the observation position information is position information of the current observer relative to the 3D scene presenting apparatus; determining a piece of 3D image information to be presented based on the observation position information and the 3D scene information; and presenting 3D content corresponding to the piece of 3D image information to be presented.

20 Claims, 4 Drawing Sheets

(51) Int. Cl.
    *H04N 13/02*     (2006.01)
    *G06T 15/20*     (2011.01)
    *H04N 9/80*     (2006.01)
    *H04N 5/92*     (2006.01)
    *H04N 5/93*     (2006.01)

(56) References Cited

FOREIGN PATENT DOCUMENTS

| | | |
|---|---|---|
| CN | 103517060 A | 1/2014 |
| CN | 104168469 A | 11/2014 |
| CN | 104349155 A | 2/2015 |
| CN | 104506841 A | 4/2015 |
| CN | 104618706 A | 5/2015 |
| CN | 104679227 A | 6/2015 |
| CN | 104820497 A | 8/2015 |
| CN | 105120251 A | 12/2015 |
| EP | 2680594 A1 | 1/2014 |
| WO | 2008041313 A1 | 4/2008 |
| WO | 2014035204 A1 | 3/2014 |

OTHER PUBLICATIONS

Second Chinese Office Action dated Apr. 12, 2017.
Chinese Office Action dated Aug. 9, 2017.
Chinese Office Action dated Oct. 19, 2016.

* cited by examiner

METHOD AND APPARATUS FOR PRESENTING 3D SCENE

TECHNICAL FIELD

Embodiments of the present disclosure relate to a method and an apparatus for presenting a 3D (three dimensional) scene.

BACKGROUND

Currently, with continuous development of the display technology, the 3D display technology has attracted a great deal of attention. The 3D display technology enables images to be stereoscopic and look like real. A basic principle for the 3D display lies in that different images are respectively received by a left eye and a right eye of a person and then are overlapped to reproduce image information by the human brain to form stereoscopic images.

However, in the current 3D display technology, an observer can only see a single 3D image, and 3D images in different view angles cannot be observed. As shown in FIG. 1, a display device is indicated as N. Take a hexahedron M in a 3D scene as an example. Generally, when standing at an observation position A, an observer can only see one 3D image of the hexahedron M. In this 3D image only a surface a, a surface b and a surface c can be observed, and other surfaces of the hexahedron M cannot be seen. When the observer moves to an observation position B, the observer still sees the previous 3D image, and the observer cannot experience a real-life visual effect that different 3D images can be seen from different view angles, and thus, a viewing experience of the observer is decreased.

SUMMARY

Embodiments of the present disclosure provide a method and an apparatus for presenting a 3D image scene, by which a problem in existing technologies that a single observer cannot observe different 3D images in the 3D scene as his observation position is varied can be solved.

In one aspect, embodiments of the present disclosure provide a 3D scene presenting method for application in a 3D scene presenting apparatus. The 3D scene presenting method includes: loading 3D scene information, where multiple pieces of 3D image information are stored in the 3D scene information, and each piece of 3D image information carries corresponding shooting position information; determining observation position information of a current observer in real time when the observer is detected in a viewable angle range of the 3D scene presenting apparatus, where the observation position information is position information of the current observer relative to the 3D scene presenting apparatus; determining a piece of 3D image information to be presented based on the observation position information and the 3D scene information; and presenting 3D content corresponding to the piece of 3D image information to be presented.

In another aspect, embodiments of the present disclosure provide a 3D scene presenting apparatus, including: a loading unit configured to load 3D scene information, where multiple pieces of 3D image information are stored in the 3D scene information, and each piece of 3D image information carries corresponding shooting position information; a determining unit configured to determine observation position information of a current observer in real time when the observer is detected in a viewable angle range of the 3D scene presenting apparatus, where the observation position information is position information of the current observer relative to the 3D scene presenting apparatus; a processing unit configured to determine a piece of 3D image information to be presented based on the observation position information and the 3D scene information; and a presenting unit configured to present 3D content corresponding to the piece of 3D image information to be presented.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings.

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. The drawings mentioned in the embodiments of the present disclosure are only to For example illustrate the technical solutions of the present disclosure. The other drawings obtained from the drawings of the embodiments of the present disclosure through simple transformations should be within the scope of the present disclosure.

Hereinafter, technical solutions involved in the present disclosure will be described in details by way of embodiments, and the present disclosure includes, but is not limited to, the following embodiments.

A First Embodiment

Figure 1:
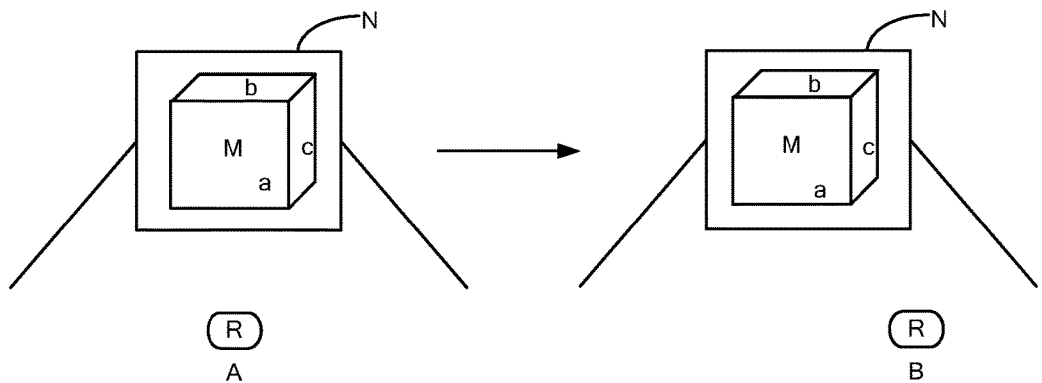
FIG. 1 is a schematic view showing an identical 3D image observed at a position A and a position B in a viewable angle range by an observer as provided by existing technologies.
Figure 2:
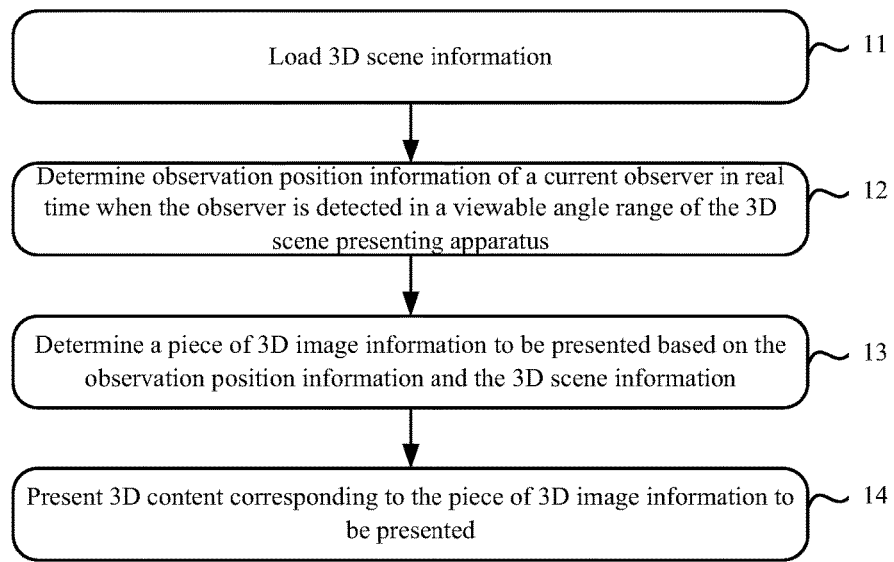
FIG. 2 is a flowchart diagram showing a method for presenting a 3D scene provided by a first embodiment of the present disclosure.

As shown in FIG. 2, a flowchart diagram showing a method for presenting a 3D scene provided by a first embodiment of the present disclosure is illustrated. The method is applied in presenting scenes to a single observer, and the observer can move within a viewable angle range of a 3D presenting apparatus. The method includes the following steps:

Step 11: loading 3D scene information.

Multiple pieces of 3D image information may be stored in the 3D scene information, and each piece of the 3D image information also includes corresponding shooting position information.

For example, the 3D scene information can be obtained in the following manner: determining a 3D scene to be shot; configuring an image collecting device at a preset initial shooting point, and correspondingly recording shooting position information of the current initial shooting point; shooting the 3D scene while the image collecting device is moved within a viewing angle range of the 3D scene, and correspondingly recording all shooting position information on a path along which the image collecting device is moved; performing image reconstruction on respective left viewpoint image information and respective right viewpoint image information that are obtained by the shooting to form multiple pieces of 3D image information.

Figure 3:
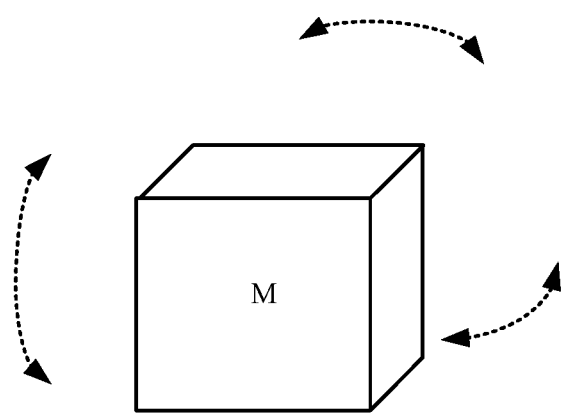
FIG. 3 is a simplified schematic view showing a 3D scene illustrated in the first embodiment of the present disclosure.

For example, as shown in FIG. 3, after determining a 3D scene M, it is desirable to shoot the 3D scene M from full azimuth and simultaneously record the azimuth information of each shooting angle. Dashed lines in the figures only illustrate part of the shooting paths. It is to be noted that the azimuth information may be associated with the observation position information of an observer subsequently, while the observation position information can be limited within the viewable angle range at a viewing side of a display screen of the 3D scene presenting apparatus and another side (e.g., a rear side) of the display device may not be relevant to the observation position information. Thus, the azimuth information may correspond to the observation position information, the observation position information is overlapped with part of the azimuth information, and a configuration manner and a reference object for the azimuth information and the observation position information may be kept as consistent as possible. The above-mentioned image collecting device used for shooting can be a camera having image collecting and image processing functions.

Figure 4:
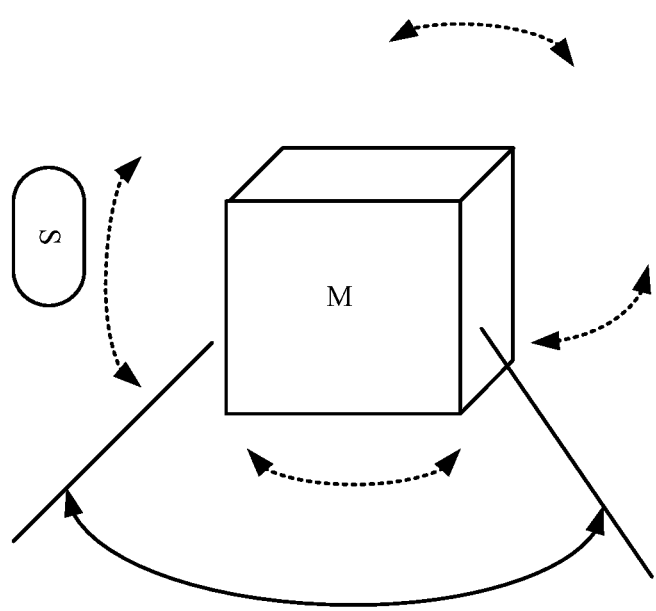
FIG. 4(a) is a schematic view of the 3D scene M captured by a camera S.
FIG. 4(b) is a schematic view showing that an observer R views a 3D scene in a viewable angle range of a 3D scene presenting apparatus N.
Figure 4:
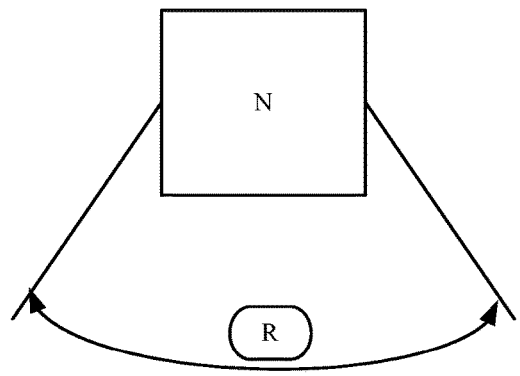

In connection with FIG. 4(a) and FIG. 4(b), a schematic view of the 3D scene M shot by a camera S and a schematic view showing that an observer R is viewing in the viewable angle range of the 3D scene presenting apparatus N are shown respectively. As shown in FIG. 4(a), the camera S can be used to shoot the 3D scene M from any shootable angle range in the three dimensional space, and therefore, the recorded shooting position information can be azimuth information in any shootable angle range in the three dimensional space. For example, after the shooting is completed, H pieces of 3D image information can be obtained by reconstruction. At the same time, each piece of the 3D image information may carry its corresponding shooting position information, where the shooting position information may be obtained based on any kind of physical coordinates capable of representing the azimuth information in the 3D scene, and the shooting position information is used to indicate a position relationship relative to the 3D scene M (for example, a longitude, a latitude, a linear distance from the 3D scene, and so on). For example, consider the 3D scene M as an original point of the coordinate system; the shooting position information can include an X-coordinate, a Y-coordinate, and a Z-coordinate relative to the original point. As shown in FIG. 4(b), the observer can only see the 3D images presented on a display screen within the viewable angle range of the 3D scene presenting apparatus N, and therefore, the observation position information of the observer R can be limited to the azimuth information within the viewable angle range.

It is to be noted that in embodiments of the present disclosure the 3D scene information may also be obtained by using other methods such as system modeling, etc.

Step 12: when the observer is detected in the current viewable angle range, determining an observation position of the current observer in real time to obtain the observation position information.

The observation position information is the position information of the current observer relative to the 3D scene presenting apparatus.

For example, in the step 12, determining the observation position information of the current observer in real time includes: capturing eye information of the observer in real time and determining the observation position of the observer based on the captured eye information. Herein, it is to be noted that the way to obtain the observation position information in embodiments of the present disclosure includes, but is not limited to, the above obtaining operation, and may also include determining the observation position of the observer by capturing other body parts, e.g., the head of the observer.

For example, capturing the eye information of the observer can be implemented by human eye detection using a single camera or multiple cameras. Additionally or alternatively, the human eye detection may be implemented by an infrared detection device provided on the display screen of the 3D scene presenting apparatus. For example, the infrared detection device can be integrated into the camera, so that they can function cooperatively to perform the human eye detection to improve accuracy.

Step 13: determining a piece of 3D image information to be presented based on the observation position information and the 3D scene information.

For example, the step 13 may include: searching the 3D scene information based on the observation position information, and using a piece of 3D image information that is obtained through the search and corresponds to the observation position information as the piece of 3D image information to be presented.

During a practical implementation, an information parameter correspondence table, which is constructed by each piece of 3D image information and shooting position information carried by the corresponding piece of 3D image information, is established in advance. Then, the observation position information is compared with each shooting position information stored in the information parameter correspondence table one by one, and then based on the preset association between the observation position and the shooting position, a piece of 3D image information corresponding to the observation position information is taken as the piece of 3D image information to be presented.

Step 14: presenting 3D content corresponding to the piece of 3D image information to be presented.

For example, if the observer does not move in the viewable angle range of the 3D scene presenting apparatus, the above method may further include the following steps:

First step: receiving a 3D image switching instruction, where the 3D image switching instruction at least includes a rotation switching instruction, a zoom out switching instruction, a zoom in switching instruction, and/or a shift switching instruction.

For example, the 3D image switching instruction may be information of a key selectively sent by the observer by using a control terminal such as a remote controller or the like, and may also be gesture information of the observer (for the 3D scene presenting apparatus having a touch screen).

Second step: analyzing the 3D image switching instruction to determine a switching type and shooting position information after switching.

Third step: searching the 3D scene information to obtain a piece of 3D image information to be switched to based on the shooting position information after switching.

Fourth step: switching to the piece of 3D image information based on the switching type and presenting 3D content corresponding to the piece of 3D image information.

It is to be noted that the embodiment relevant to the above first step to fourth step are mainly used for the situation when the observer does not move. For example, when the observer moves to a boundary of the viewable angle range, if he or she continuously moves in a direction away from the 3D scene present apparatus intending to view other 3D images, then he or she will enter into a non-viewable angle range. Therefore, the limited observation position information for the observer prevents the observer from viewing 3D content of other 3D images except the 3D image information corresponding to the observation position information presented by the 3D image information. That is, in the situation when the observer moves, only limited different 3D images rather than all the different 3D images can be seen if relying on automatic identification manner.

Hereinafter, the technical solution of the above first embodiment will be described in further detail by some examples.

Example 1

Figure 5:
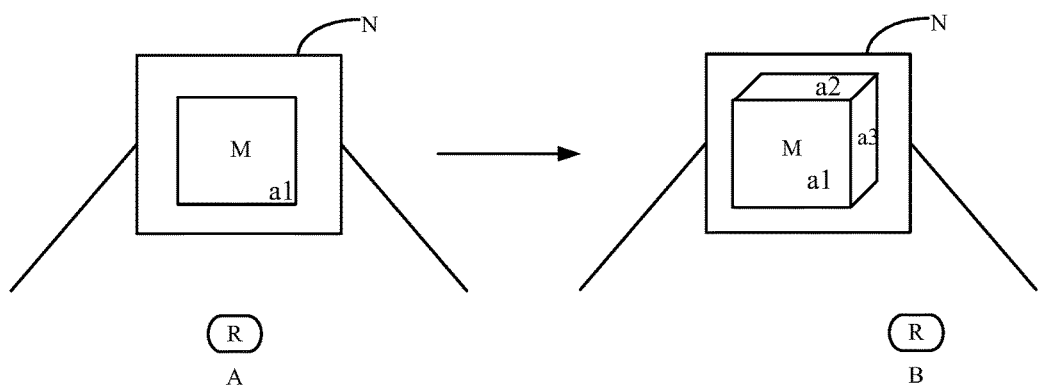
FIG. 5 is a schematic view of different 3D images observed by an observer at a position A and a position B in the viewable angle range respectively.

After the 3D presenting apparatus is initialized and turned on, the 3D scene information to be presented is loaded. Before the 3D scene information is presented, firstly the 3D presenting apparatus detects whether or not an observer is presented in the current viewable angle range. If not, 3D image information in the 3D scene information is presented according to a preset playing rule. For example, a piece of 3D image information corresponding to shooting position information at an initial shooting point can be played. If an observer is detected, it is further determined whether or not movement of the observation position of the observer is detected. If the observation position of the observer is moved, a built-in infrared camera is used to detect eye information in real time, and real-time observation position information of the observer is determined based on the eye information. Take a scenario when the observer moves horizontally from a position A to a position B in front of the display screen of the 3D scene presenting apparatus in FIG. 5 as an example. When the observer is at the position A, firstly azimuth information of the current position A is determined, and then the 3D scene information is looked up based on the azimuth information to determine a piece of 3D image information to be presented therefrom. The piece of 3D image information is then presented. As shown, when the observer is at the position A, a surface a1 of a hexahedron can be seen. When the observer moves to the position B, then the current azimuth information of the observer is determined again, and another piece of 3D image information to be presented at this time is determined according to the azimuth information. The other piece of 3D image information is then presented. As shown, when the observer is at the position B, three surfaces a1, a2, and a3 can be seen. Thus, it appears that the observer is at a real 3D scene. Furthermore, in this example 1, assume that the position A is continuous with the position B and the time for switching between the two images can be neglected. Relative continuous 3D images can be seen by the observer.

Herein, it is to be noted that when the observer is actually viewing, different images may be respectively received by his or her left and right eyes. Thus, through overlapping and reproducing the image information by his or her brain, a 3D image effect is achieved. This kind of image forming manner can be applicable to all embodiments involved in the present disclosure.

By such a solution, it is possible to guarantee that 3D images at different view angles can be seen when the observer moves in the viewable angle range of the 3D scene presenting apparatus. Moreover, it is possible to enable the observer to experience the visual effect like that he or she is viewing the presented 3D scene in a real environment as much as possible.

Example 2

Each of the display device like the 3D scene presenting apparatus has a limited viewable angle range. Although the observer can observe the 3D images (3D image content) from different angles during his movement, 3D images corresponding to a rear side of the real 3D scene can not be seen. Therefore, in order to improve the observer's viewing experience, in the example 2 of the present disclosure, a manual adjustment manner is enabled to assist the observer to improve his or her viewing experience. In the example 2, at least two manners as described below can be employed.

Manner 1:

For a 3D scene presenting apparatus having a touch control function, various touch operations can be performed on the 3D scene presenting apparatus based on the touch control manner, and can be converted into 3D image switching instructions interpretable by the 3D scene presenting apparatus. Then, a switching type and shooting position information after switching can be determined based on the interpretation result. Next, a piece of 3D image information to be switched to is looked up from the 3D scene information, and 3D content corresponding to the piece of 3D image information is presented.

Figure 6:
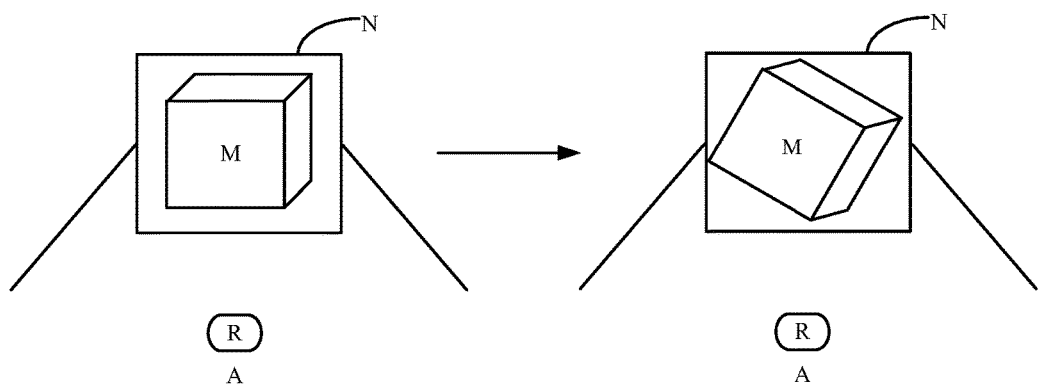
FIG. 6 is a schematic view showing different 3D images viewed by the observer at the position A.

For example, what is currently presented is a 3D image at the left side of FIG. 6. If the observer wants to see a 3D image after the hexahedron is inclined, he or she may apply a touch operation on the display screen, where the touch operation corresponds to a rotation operation. Thus, the 3D scene presenting apparatus receives a 3D image switching instruction corresponding to the touch operation, and interprets the touch operation to determine a switching type as rotation. Shooting position information after switching can be determined based on an application range of the touch operation on the display screen. Finally, it is switched to a 3D image as shown at the right side of FIG. 6.

Manner 2:

However, not all the 3D scene presenting apparatuses have a touch control function. Therefore, for a 3D scene presenting apparatus that does not have any touch control function, a control device usable with the 3D scene presenting apparatus such as a remote controller or the like can be used. A 3D image switching instruction can be sent to the 3D scene presenting apparatus by operating on a preset key (such as clicking, long-time pressing, or the like on a preset key). The 3D scene presenting apparatus receives and interprets the 3D image switching instruction, and determines a switching type and shooting position information after switching. Afterwards, operations similar to those in Manner 1 as described above are carried out, and thus will not be repeated here.

It is noted that in embodiments of the present disclosure, the 3D image switching instruction includes, but is not limited to, a rotation switching instruction, a zoom out switching instruction, a zoom in switching instruction or a shift switching instruction. The 3D scene presenting apparatus interprets a corresponding switching type and shooting position information after switching based on a preset instruction interpretation manner.

It is to be noted that for "moving the image collecting device to shoot in the viewable angle range of the 3D scene and correspondingly recording all the shooting position information on the path therefrom" as used herein, a step length by which the image collecting device is moved at a time can be set according to actual needs by a person skilled in the art. For example, the step length can be set by taking a computing speed, an amount of data to be processed and so on into consideration. For example, since a pupil distance of human eyes is about 65 mm, and the step length by which the camera is moved may not be less than the pupil distance, and the step length can be set as the pupil distance.

Embodiments of the present disclosure also provide a 3D scene presenting apparatus belonging to a same or similar inventive concept as the 3D presenting method as provided by the first embodiment of the present disclosure. Hereinafter, a second embodiment will be described in details.

A Second Embodiment

Figure 7:
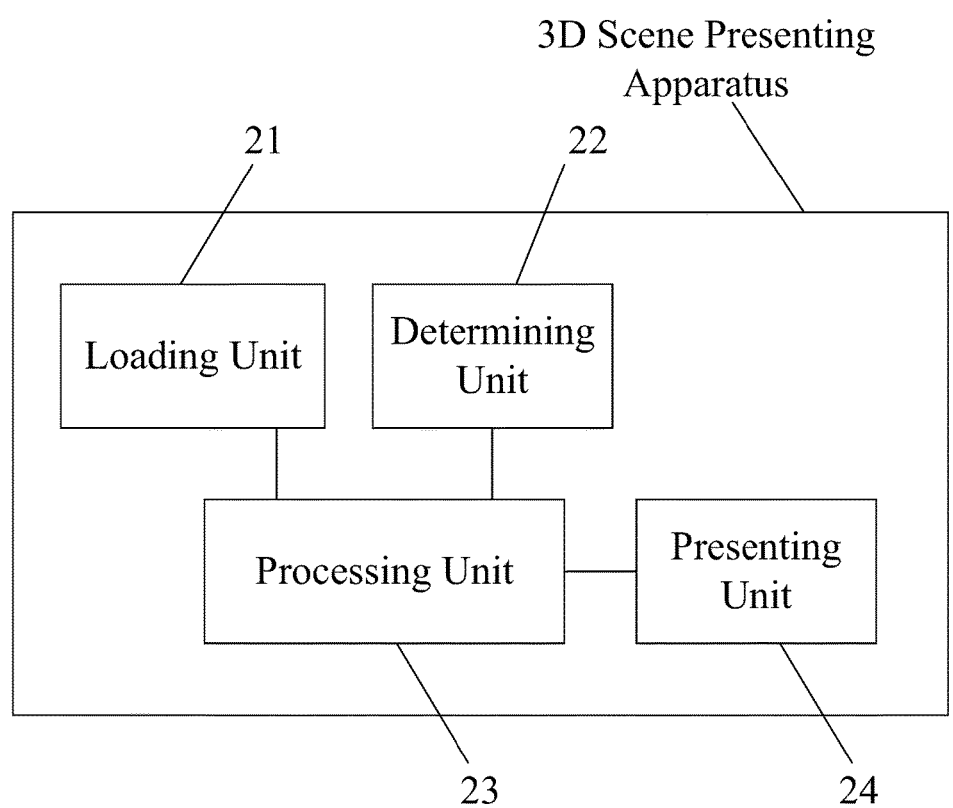
FIG. 7 is a schematic view showing a structure of a 3D scene presenting apparatus provided by a second embodiment of the present disclosure.

In the second embodiment of the present disclosure, the 3D scene presenting apparatus can be a display device, and can be a liquid crystal display device, an OLED display device, a plasma display device, or the like, but the present disclosure is not limited thereto as long as the display device can achieve 3D display effect. The 3D scene presenting apparatus includes structural components, such as a display screen, a display module, a driving module, and so on. In this embodiment of the present disclosure, the 3D scene presenting apparatus further includes structural units capable of achieving the functionality of the embodiments of the present disclosure. As shown in FIG. 7, the 3D scene presenting apparatus includes:

a loading unit 21 for loading 3D scene information. Multiple pieces of 3D image information are stored in the 3D scene information and each piece of the 3D image information carries its corresponding shooting position information.

For example, the 3D scene information loaded in the loading unit 21 can be obtained in the following manner: determining a 3D scene to be shot; configuring an image collecting device at a preset initial shooting point, and correspondingly recording shooting position information of the current initial shooting point; shooting the 3D scene while the image collecting device is moved within a viewable angle range of the 3D scene, and correspondingly recording all shooting position information on a path along which the image collecting device is moved; performing image reconstruction on respective left viewpoint image information and respective right viewpoint image information that are obtained by shooting to form multiple pieces of 3D image information.

A determining unit 22 for determining observation position information of a current observer in real time when the observer is detected in the current viewable angle range. The observation position information is position information of the current observer with respect to the 3D scene presenting apparatus.

For example, the determining unit 22 is configured to capture eye information of the observer when the observer is detected in the current viewable angle range and to determine the observation position information of the observer based on the captured eye information.

A processing unit 23 for determining a piece of 3D image information to be presented based on the observation position information and the 3D scene information.

For example, the processing unit 23 is configured to search the 3D scene information based on the observation position information, and to use a piece of 3D image information that is obtained through the search and corresponds to the observation position information as the piece of 3D image information to be presented.

A presenting unit 24 for presenting 3D content corresponding to the piece of 3D image information to be presented.

For example, in order to improve the viewing experience of the observer more effectively, the 3D scene presenting apparatus may further include: a receiving unit for receiving a 3D image switching instruction when the observer does not move in the viewable angle range of the 3D scene presenting apparatus; an interpreting unit for interpreting the 3D image switching instruction received by the receiving unit to determine a switching type and shooting position information after switching. Thus, the processing unit may also be used to search the 3D scene information to obtain a piece of 3D image information to be switched to based on the shooting position information after switching determined by the interpreting unit. The presenting unit may also be used to switch to the piece of 3D image information based on the switching type determined by the interpreting unit and to present 3D content corresponding to the piece of 3D image information to be switched to, where the 3D image switching instruction at least includes a rotation switching instruction, a zoom out switching instruction, a zoom in switching instruction, or a shift switching instruction.

It is to be noted that for "moving the image collecting device to shoot in the viewable angle range of the 3D scene and correspondingly recording all the shooting position information on the path therefrom" as used herein, a step length by which the image collecting device is moved at a time can be set according to actual needs by a person skilled in the art. For example, the step length can be set by taking a computing speed, an amount of data to be processed and so on into consideration. For example, since a pupil distance of human eyes is about 65 mm, and the step length by which the camera is moved may not be less than the pupil distance, and the step length can be set as the pupil distance.

From the above technical solution, it can be seen that embodiments of the present disclosure enables the observer to see different 3D images from any observation position in the viewable angle range and to experience the same effect as viewing the 3D scene in the real environment as much as possible, by: loading the 3D scene information to the 3D scene presenting apparatus, where multiple pieces of 3D image information that carry the corresponding shooting position information are stored into the 3D scene information; and determining a piece of 3D image information to be presented according to the observation position of the current observer.

In the above technical solution, the 3D scene information is loaded, where multiple pieces of 3D image information carrying the corresponding shooting position information are stored in the 3D scene information. Observation position information, which is position information of a current observer with respect to the 3D scene presenting apparatus, is determined in real time when the observer is detected in the current viewable angle range. Then a piece of 3D image information to be presented is determined according to the observation position information and the 3D scene information. 3D content corresponding to the piece of 3D image information to be presented is presented. It is possible to guarantee that different 3D content can be seen at different viewing positions in the viewable angle range, thereby improving the observer's viewing experience.

Although the embodiments of the present disclosure have been described above, other variation and modification can be made in the embodiments by a person skilled in the art in light of the basic inventive concept of the present disclosure. Thus, the following claims is intended to be construed as covering the embodiments and all the variations and modifications fallen within the scope of the present disclosure.

It is obvious that various variations and modifications can be made by a person skilled in the art without departing from the spirit and scope of the present disclosure. These variations and modifications are intended to be covered by the present disclosure if these variation and modification fall within the scope as defined by claims and the equivalents.

The present disclosure claims the benefits of Chinese patent application No. 201510512281.3, which was filed on Aug. 19, 2015 and is incorporated herein in its entirety by reference as part of this application.

What is claimed is:

1. A 3D scene presenting method for application in a 3D scene presenting apparatus, comprising:
   loading 3D scene information, wherein multiple pieces of 3D image information are stored in the 3D scene information, and each piece of 3D image information carries corresponding shooting position information;
   determining observation position information of a current observer in real time when the observer is detected in a viewable angle range of the 3D scene presenting apparatus, wherein the observation position information is position information of the current observer relative to the 3D scene presenting apparatus;
   determining a piece of 3D image information to be presented based on the observation position information and the 3D scene information; and
   presenting 3D content corresponding to the piece of 3D image information to be presented;
   wherein if the observer does not move in the viewable angle range of the 3D scene presenting apparatus, the method further comprises;
   receiving a 3D image switching instruction;
   analyzing the 3D image switching instruction to determine a switching type and shooting position information after switching;
   searching the 3D scene information to obtain a second niece of 3D image information to be switched to based on the shooting position information after switching; and
   switching to the second piece of 3D image information based on the switching type and presenting 3D content corresponding to the second piece of 3D image information.

2. The 3D scene presenting method according to claim 1, wherein the 3D scene information is obtained by:
   determining a 3D scene to be shot;
   configuring the image collecting device at a preset initial shooting point, and correspondingly recording shooting position information of the initial shooting point;
   shooting the 3D scene while the image collecting device is moved at least within the viewable angle range of the 3D scene, and correspondingly recording all shooting position information on a path along which the image collecting device is moved; and
   performing image reconstruction on respective left viewpoint image information and respective right viewpoint image information that are obtained by the shooting to form the multiple pieces of 3D image information.

3. The 3D scene presenting method according to claim 2, wherein if the observer does not move in the viewable angle range of the 3D scene presenting apparatus, the method further comprises:
   receiving a 3D image switching instruction;
   analyzing the 3D image switching instruction to determine a switching type and shooting position information after switching;
   searching the 3D scene information to obtain a second piece of 3D image information to be switched to based on the shooting position information after switching; and
   switching to the second piece of 3D image information based on the switching type and presenting 3D content corresponding to the second piece of 3D image information,
   wherein the 3D image switching instruction at least includes a rotation switching instruction, a zoom out switching instruction, a zoom in switching instruction, or a shift switching instruction.

4. The 3D scene presenting method according to claim 1, wherein determining the observation position information of the current observer in real time comprises:
   capturing eye information of the observer in real time and determining the observation position information of the observer based on the captured eye information.

5. The 3D scene presenting method according to claim 1, wherein determining the piece of 3D image information to be presented based on the observation position information and the 3D scene information comprises:
   searching the 3D scene information based on the observation position information, and using a piece of 3D image information that is obtained through the search and corresponds to the observation position information as the piece of 3D image information to be presented.

6. The 3D scene presenting method according to claim 1, wherein the 3D image switching instruction at least includes a rotation switching instruction, a zoom out switching instruction, a zoom in switching instruction, or a shift switching instruction.

7. The 3D scene presenting method according to claim 1, wherein determining the piece of 3D image information to be presented based on the observation position information and the 3D scene information includes:
   taking a piece of 3D image information corresponding to the observation position information as the piece of 3D image information to be presented based on a preset association between corresponding observation positions and shooting position information carried by the multiple pieces of 3D image information.

8. The 3D scene presenting method according to claim 7, wherein prior to determining the piece of 3D image information to be presented based on the observation position information and the 3D scene information, the method further comprises:
establishing an information parameter correspondence table between each piece of 3D image information and corresponding shooting position information carried by the multiple pieces of 3D image information.

9. The 3D scene presenting method according to claim 1, wherein the 3D image switching instruction is input manually by the observer.

10. A 3D scene presenting apparatus, comprising:
a loading unit configured to load 3D scene information, wherein multiple pieces of 3D image information are stored in the 3D scene information, and each piece of 3D image information carries corresponding shooting position information;
a determining unit configured to determine observation position information of a current observer in real time when the observer is detected in a viewable angle range of the 3D scene presenting apparatus, wherein the observation position information is position information of the current observer relative to the 3D scene presenting apparatus;
a processing unit configured to determine a piece of 3D image information to be presented based on the observation position information and the 3D scene information; and
a presenting unit configured to present 3D content corresponding to the piece of 3D image information to be presented;
a receiving unit configured to receive a 3D image switching instruction when the observer does not move in the viewable angle range of the 3D scene presenting apparatus; and
an interpreting unit configured to analyze the 3D image switching instruction to determine a switching type and shooting position information after switching;
wherein the processing unit is further configured to search the 3D scene information to obtain a second piece of 3D image information to be switched to based on the shooting position information after switching;
wherein the presenting unit is further configured to switch to the second piece of 3D image information based on the switching type and present 3D content corresponding to the second piece of 3D image information.

11. The 3D scene presenting apparatus according to claim 10, wherein the 3D scene information is obtained by:
determining a 3D scene to be shot;
configuring the image collecting device at a preset initial shooting point, and correspondingly recording shooting position information of the initial shooting point;
shooting the 3D scene while the image collecting device is moved at least within the viewable angle range of the 3D scene, and correspondingly recording all shooting position information on a path along which the image collecting device is moved; and
performing image reconstruction on respective left viewpoint image information and respective right viewpoint image information that are obtained by shooting to form the multiple pieces of 3D image information.

12. The 3D scene presenting apparatus according to claim 11, further comprising:
a receiving unit configured to receive a 3D image switching instruction when the observer does not move in the viewable angle range of the 3D scene presenting apparatus;
an interpreting unit configured to analyze the 3D image switching instruction to determine a switching type and shooting position information after switching;
wherein the processing unit is further configured to search the 3D scene information to obtain a second piece of 3D image information to be switched to based on the shooting position information after switching;
wherein the presenting unit is further configured to switch to the second piece of 3D image information based on the switching type and present 3D content corresponding to the second piece of 3D image information; and
wherein the 3D image switching instruction at least includes a rotation switching instruction, a zoom out switching instruction, a zoom in switching instruction, or a shift switching instruction.

13. The 3D scene presenting apparatus according to claim 10, wherein the determining unit is configured to capture eye information of the observer in real time and determine the observation position information of the observer based on the captured eye information.

14. The 3D scene presenting apparatus according to claim 13, further comprising:
a receiving unit configured to receive a 3D image switching instruction when the observer does not move in the viewable angle range of the 3D scene presenting apparatus;
an interpreting unit configured to analyze the 3D image switching instruction to determine a switching type and shooting position information after switching;
wherein the processing unit is further configured to search the 3D scene information to obtain a second piece of 3D image information to be switched to based on the shooting position information after switching;
wherein the presenting unit is further configured to switch to the second piece of 3D image information based on the switching type and present 3D content corresponding to the second piece of 3D image information; and
wherein the 3D image switching instruction at least includes a rotation switching instruction, a zoom out switching instruction, a zoom in switching instruction, or a shift switching instruction.

15. The 3D scene presenting apparatus according to claim 10, wherein the processing unit is configured to search the 3D scene information based on the observation position information, and to use a piece of 3D image information that is obtained through the search and corresponds to the observation position information as the piece of 3D image information to be presented.

16. The 3D scene presenting apparatus according to claim 10,
wherein the 3D image switching instruction at least includes a rotation switching instruction, a zoom out switching instruction, a zoom in switching instruction, or a shift switching instruction.

17. The 3D scene presenting apparatus according to claim 10, wherein the processing unit is also configured to take a piece of 3D image information corresponding to the observation position information as the piece of 3D image information to be presented based on a preset association between corresponding observation positions and shooting position information carried by the multiple pieces of 3D image information.

18. The 3D scene presenting apparatus according to claim 17, wherein the processing unit is also configured to establish an information parameter correspondence table between each piece of 3D image information and corresponding shooting position information carried by the multiple pieces of 3D image information.

19. The 3D scene presenting apparatus according to claim 10, wherein the 3D image switching instruction is manually input by the observer.

20. A 3D scene presenting apparatus, comprising:
a processor; and
a memory for storing computer program instructions, wherein, the computer program instructions, when being executed by the processor, perform the processes of:
loading 3D scene information, wherein multiple pieces of 3D image information are stored in the 3D scene information, and each piece of 3D image information carries corresponding shooting position information;
determining observation position information of a current observer in real time when the observer is detected in a viewable angle range of the 3D scene presenting apparatus, wherein the observation position information is position information of the current observer relative to the 3D scene presenting apparatus;
determining a piece of 3D image information to be presented based on the observation position information and the 3D scene information;
presenting 3D content corresponding to the piece of 3D image information to be presented;
receiving a 3D image switching instruction when the observer does not move in the viewable angle range of the 3D scene presenting apparatus;
analyzing the 3D image switching instruction to determine a switching type and shooting position information after switching;
searching the 3D scene information to obtain a second piece of 3D image information to be switched to based on the shooting position information after switching; and
switching to the second piece of 3D image information based on the switching type and present 3D content corresponding to the second piece of 3D image information.

* * * * *